2 Sheets—Sheet 1.

W. BUTTS.
Fruit and Hop-Drier.

No. 198,791. Patented Jan. 1, 1878.

W. BUTTS.
Fruit and Hop-Drier.

No. 198,791. Patented Jan. 1, 1878.

Witnesses
John L. Boone
Frank A. Brooks

Inventors
William Butts
by Dewey & Co
Attys

UNITED STATES PATENT OFFICE.

WILLIAM BUTTS, OF PETALUMA, CALIFORNIA.

IMPROVEMENT IN FRUIT AND HOP DRIERS.

Specification forming part of Letters Patent No. 198,791, dated January 1, 1878; application filed September 17, 1877.

*To all whom it may concern:*

Be it known that I, WILLIAM BUTTS, of Petaluma, county of Sonoma, and State of California, have invented an Improved Fruit and Hop Drier; and I do hereby declare the following to be a full, clear, and exact description thereof, reference being had to the accompanying drawings.

My invention relates to a combined cooking and drying apparatus. The cooking portion of the apparatus is intended for cooking such vegetables as require to be cooked before being dried or evaporated, while the drier portion can be used for drying any and all kinds of fruit and vegetables, and is especially adapted for drying hops.

Figure 1:
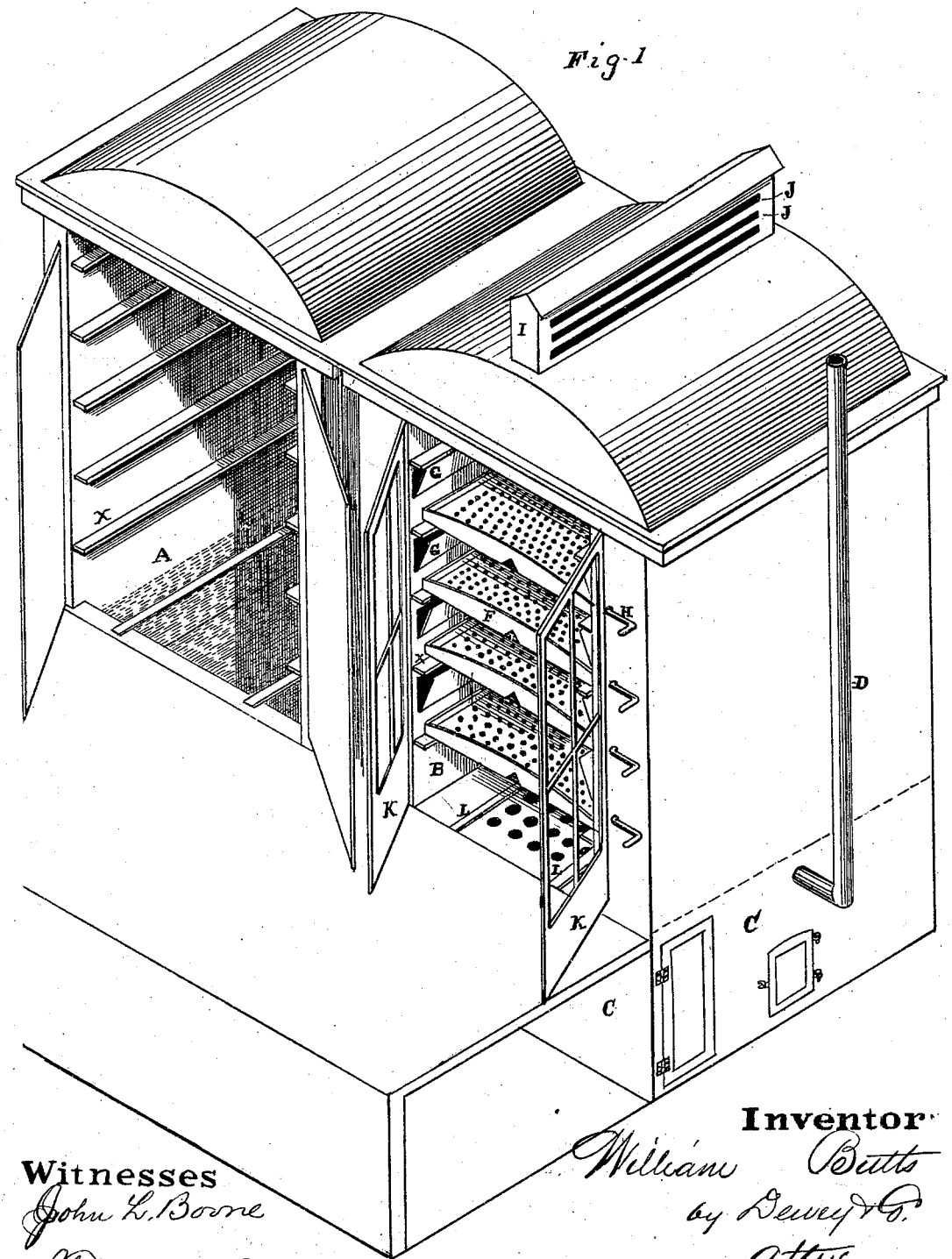
Figure 2:
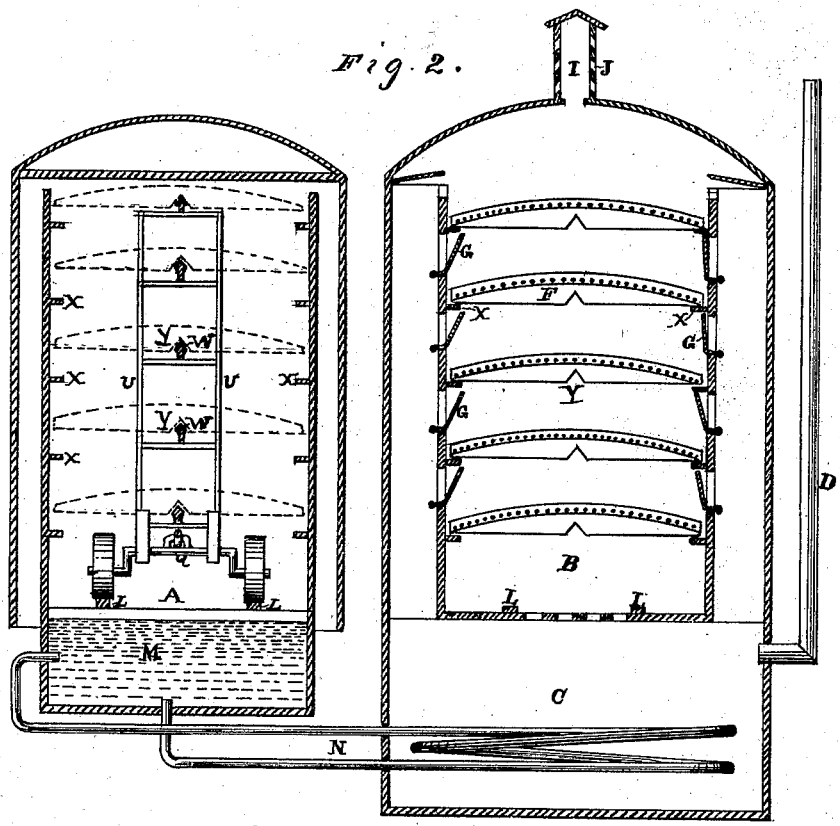
Figure 3:
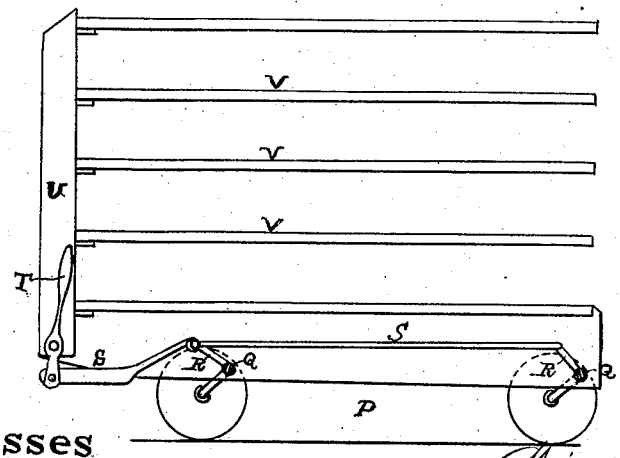

Referring to the accompanying drawings, Figure 1 is a perspective view; Fig. 2, a transverse vertical section; Fig. 3, a detail view.

Let A represent the cooking, and B the drying, compartments. These compartments may either be embodied in a single structure, or they may be built independent of each other.

Under the drying-compartment B I construct a furnace-chamber, C, from which the chimney or stack D leads, as represented. The chamber B has double side walls, and the heated air from the furnace rises upward into the space between these walls. Openings are made in the bottom and sides of the inner walls of the chamber, and these openings are closed by valves when desired, so that the amount of heat to be admitted can be regulated as desired.

The trays F are supported on ledges X in the chamber, one above another, in the ordinary way; but I construct the trays somewhat differently from the usual method. Instead of making them flat I make them convex on their upper side and concave underneath, and I admit the heat from the side walls directly under each edge. This causes a portion of the heat to concentrate under the middle of the tray, so that the fruit is dried evenly over the entire tray-surface. When flat trays are used the principal heat passes up through them at the point where it first comes in contact with them, at or near their sides or edges, so that the fruit in the middle of the tray does not dry as fast or as evenly as that along the edges; but by making the bottom of the tray concave the heat is directed toward the middle and spreads evenly over the entire surface, rendering the drying process uniform.

The valves G in the sides of the chambers extend the entire length of the chamber, and each one is operated by a handle, H, on the outside of the structure, so that I can open or close them at will, thus regulating the inflow of hot air as desired.

A short chimney, I, is constructed on top of the drying-structure, through which the heated air rises and escapes to the open air after it has passed through the fruit. The top of this chimney I is closed, to exclude rain, and openings J J are made in its sides. These openings can be provided with valves, by which their size can be regulated, if desired.

Each end of the compartment is provided with doors K K, so that both ends can be thrown open when desired. These doors are made of sash, and glass panes are set in them, so that the sunlight is admitted to the fruit which is under process of drying.

On the floor of each compartment I construct two tracks, L L, leading directly through the compartment.

The cooking-compartment A is made close and tight, and underneath it I construct a water-tank, M. A pipe, N, leads from this water-tank into the furnace-chamber under the fruit-drier, and is coiled around in the fire-place of a furnace located within the chamber C. Thence it leads back into the tank again, so that when the furnace is in operation a circulation of water will be established through this pipe, which heats the water in the tank from the same fire that heats the air from the drier. When this water in the tank is sufficiently heated, steam is generated, which fills the chamber and cooks the vegetables. This circulation-pipe can be made detachable and removable, so that when the cooking-chamber is not required it can be removed, and the operation of the cooking-compartment stopped.

I have also devised a convenient device for supporting the trays while they are being filled with the fruit or vegetables, and by means of which I can transport the entire number of trays and place them upon the ledges in the chambers at one time.

The device consists of a narrow truck or car, P, which is provided with cranked axles Q Q, journaled in the side bars of the car of truck. The wheels are loosely secured upon the cranked ends of the axles, so as to revolve thereon. These wheels are grooved, so as to run upon the tracks L L in the chambers. Each axle has an upward-projecting arm, R, in its middle, and these arms are connected by a rod, S, which extends forward and is attached to the lower end of a lever, T, at the forward end of the car or truck, so that by drawing the lever forward the axles are rotated and the truck lowered, and by moving it back the truck is raised.

To the forward end of the truck I secure two uprights, U U, from which a number of frames, V, project toward the rear of the truck. These frames are supported only at one end, and are spaced apart to correspond with the spaces between the trays.

To prevent the trays from falling from the racks I secure a strip or rail, W, longitudinally through the middle of each rack, and I make a notch, Y, in the under side of each tray at its middle, which will fit over the strip or rail W. The truck can then be moved about at will. When the vegetables have been placed upon the trays the doors of the cooking-chamber are thrown open, and the truck is run in upon the track. The lever T having previously been thrown back, the frames are raised high enough to allow the trays to pass in easily above the ledges. The lever is then thrown forward, and this movement lowers the entire number of horizontal frames, and leaves the trays resting upon the ledges. The car can then be withdrawn, leaving the trays in the chamber. The doors are then closed, and the cooking proceeded with. When the vegetables have been sufficiently cooked, I open the doors, run the lowered car in under the trays, throw the lever T upward, so as to raise the frames, and lift the entire number of trays at once. I then withdraw the car with its trays, and run it into the drying-chamber, where the operation is repeated, and the fruit left to be dried.

While one batch is drying in the drying-chamber another can be cooking in the cooking-chamber.

This arrangement is quite simple and convenient. It allows me to fill the trays outside of the chamber, and place them inside of the chamber in a body, so that the doors of the chamber are not left open long at a time. This drier is especially useful for drying hops, as the work can be done evenly, without subjecting them to the ordinary stirring process, thus leaving them in a better and more salable condition, and preventing the wasting of the lupuline, which is the active principle of the hops.

Having thus described my invention, what I claim, and desire to secure by Letters Patent, is—

1. The drying-chamber B, with its furnace-chamber C, in combination with a cooking-chamber, A, with its water-tank M and the circulating-pipe N, which leads to the furnace-chamber C, substantially as and for the purpose described.

2. The combination, with a drying-chamber having side openings to admit the heated air, of a series of trays, having concave under sides, substantially as and for the purpose described.

3. A drying-chamber, B, provided with the tracks L L and trays F F, in combination with the truck P, which is provided with a corresponding number of horizontal racks, V, which are supported only at one end, and which can be raised or lowered at will, substantially as and for the purpose described.

4. The trays F F, provided with the notches Y, in combination with the horizontal racks V, with their longitudinal rails or strips W, substantially as and for the purpose described.

In witness whereof I have hereunto set my hand and seal.

WILLIAM BUTTS. [L. S.]

Witnesses:
C. J. LEE,
MARTIN ARMSTRONG.